US011946384B2

(12) United States Patent
Vyvey

(10) Patent No.: US 11,946,384 B2
(45) Date of Patent: Apr. 2, 2024

(54) COMPRESSOR HOUSING FOR A TURBINE ENGINE

(71) Applicant: SAFRAN AERO BOOSTERS SA, Herstal (BE)

(72) Inventor: Morgan Vyvey, Herstal (BE)

(73) Assignee: SAFRAN AERO BOOSTERS SA, Herstal (BE)

(*) Notice: Subject to any disclaimer, the term of this patent is extended or adjusted under 35 U.S.C. 154(b) by 65 days.

(21) Appl. No.: 17/604,652

(22) PCT Filed: Apr. 10, 2020

(86) PCT No.: PCT/EP2020/060336
§ 371 (c)(1),
(2) Date: Oct. 18, 2021

(87) PCT Pub. No.: WO2020/229069
PCT Pub. Date: Nov. 19, 2020

(65) Prior Publication Data
US 2022/0251974 A1 Aug. 11, 2022

(30) Foreign Application Priority Data
May 16, 2019 (BE) .................................. 2019/5325

(51) Int. Cl.
*F01D 25/24* (2006.01)
*F01D 11/12* (2006.01)
(Continued)

(52) U.S. Cl.
CPC ............ *F01D 25/24* (2013.01); *F01D 11/122* (2013.01); *F01D 17/162* (2013.01); *F04D 29/522* (2013.01)

(58) Field of Classification Search
CPC ........ F01D 25/24; F01D 25/243; F01D 25/26; F01D 9/042; F04D 29/403; F04D 29/522;
(Continued)

(56) References Cited

U.S. PATENT DOCUMENTS 3,169,749 A * 2/1965 Harris ..................... F01D 25/26
415/68
3,746,463 A * 7/1973 Stock ...................... F01D 9/047
415/214.1
(Continued)

FOREIGN PATENT DOCUMENTS

BE 1026411 A1 1/2020
EP 1426559 A1 6/2004
(Continued)

OTHER PUBLICATIONS

International Search Report for PCT/EP2020/060336 dated Jun. 25, 2020.
Written Opinion for PCT/EP2020/060336 dated Jun. 25, 2020.

*Primary Examiner* — Sabbir Hasan
*Assistant Examiner* — Arthur Paul Golik
(74) *Attorney, Agent, or Firm* — Sandberg Phoenix & von Gontard, PC.

(57) ABSTRACT

A compressor casing for a turbine engine, the casing comprising: a housing comprising a radially inner e surface; an upstream ferrule; and a downstream ferrule; each of the ferrules having a respective inner surface capable of defining an air stream, and each of the ferrules having an outer surface facing the inner surface of the housing, the ferrules being attached to the cantilevered housing and being axially arranged so as to be separated by an axial clearance. Additionally, a turbine engine comprising such a casing and a stage of variable-setting vanes.

10 Claims, 5 Drawing Sheets

(51) Int. Cl.
*F01D 17/16* (2006.01)
*F04D 29/52* (2006.01)

(58) Field of Classification Search
CPC ............ F05D 2240/10; F05D 2240/11; F05D 2240/14; F05D 2260/941
See application file for complete search history.

(56) References Cited

U.S. PATENT DOCUMENTS

| | | | | |
|---|---|---|---|---|
| 4,214,851 | A * | 7/1980 | Tuley | F01D 25/14 415/115 |
| 4,502,809 | A | 3/1985 | Geary | |
| 2008/0193280 | A1 * | 8/2008 | Addis | B23P 6/005 415/148 |
| 2016/0024970 | A1 | 1/2016 | Zierer et al. | |
| 2016/0265373 | A1 * | 9/2016 | Annati | F04D 17/06 |
| 2017/0130608 | A1 * | 5/2017 | Wiebe | F01D 25/162 |
| 2018/0056397 | A1 * | 3/2018 | Detry | B30B 15/34 |
| 2018/0347586 | A1 * | 12/2018 | Kwak | F04D 29/542 |

FOREIGN PATENT DOCUMENTS

| | | | | |
|---|---|---|---|---|
| FR | 2147609 | A5 | 3/1973 | |
| FR | 2979386 | A1 | 3/2013 | |
| GB | 2471466 | A * | 1/2011 | ........... F01D 21/045 |

* cited by examiner

PRIOR ART

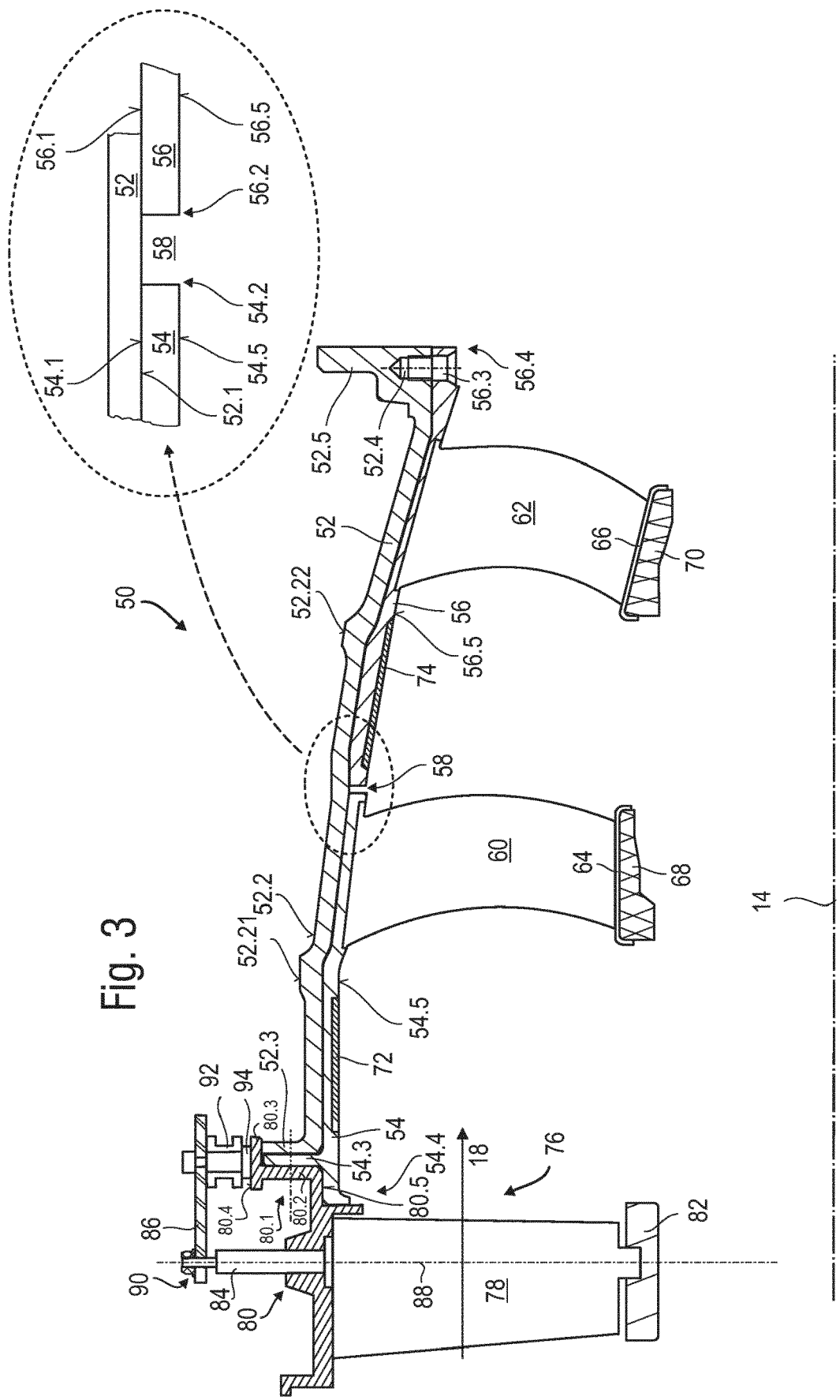

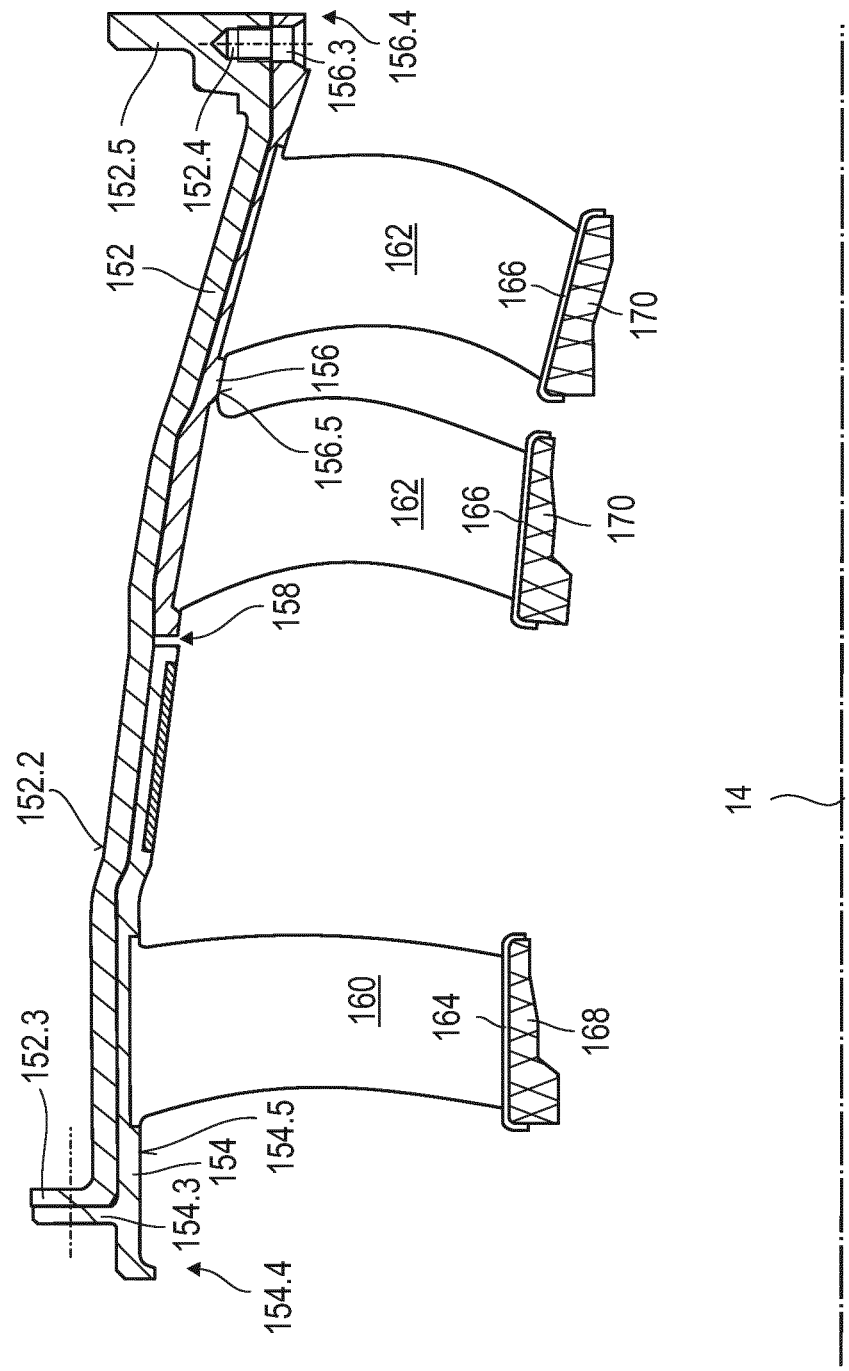

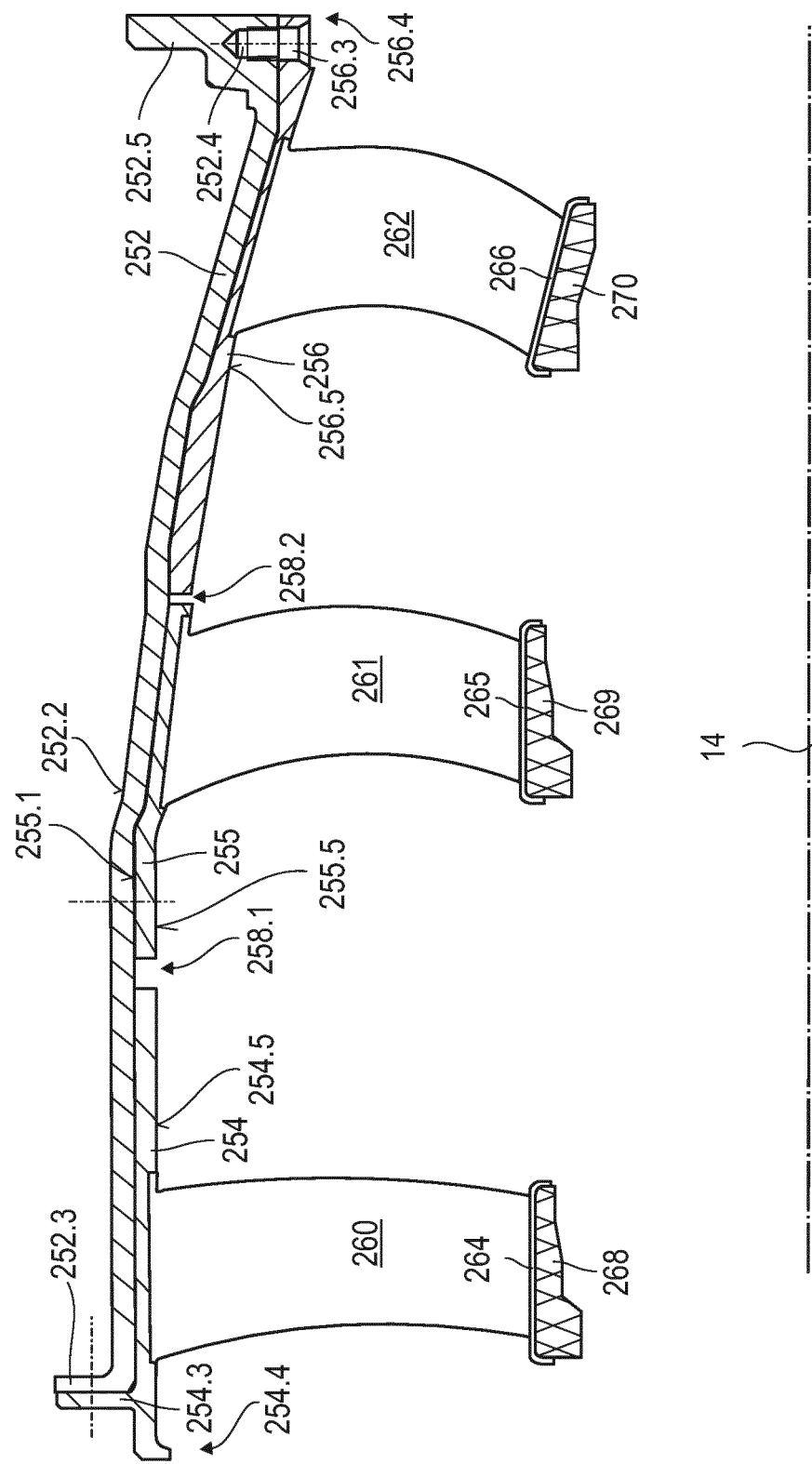

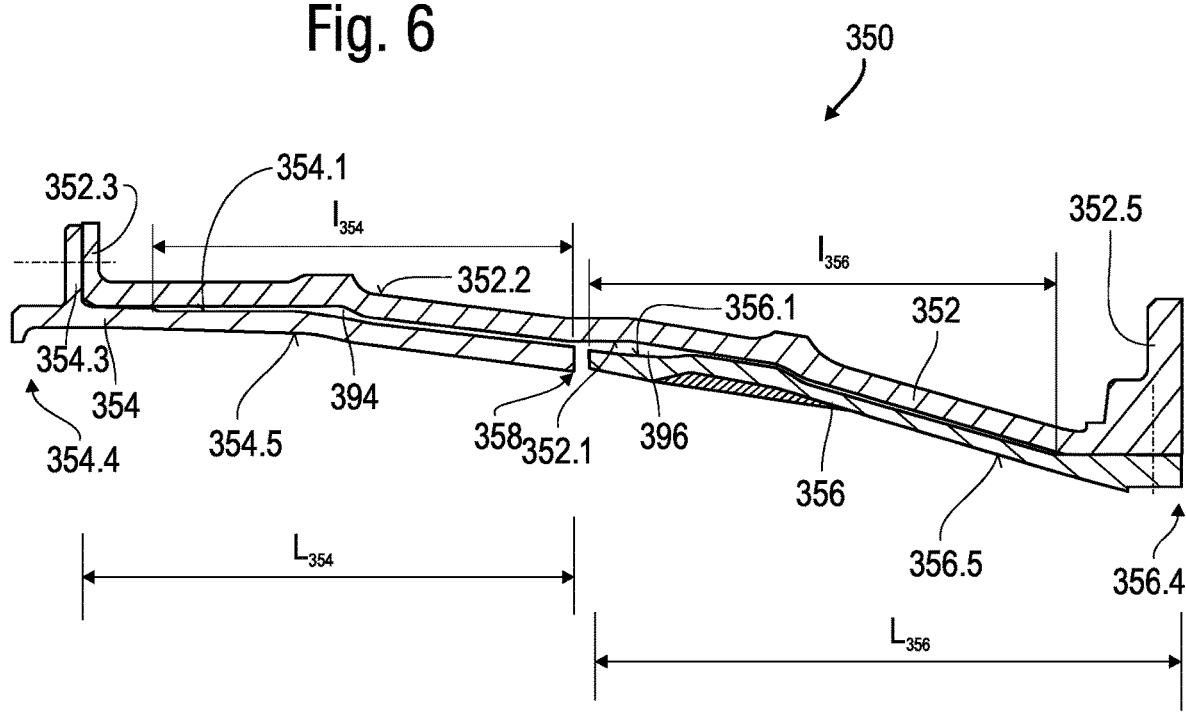

COMPRESSOR HOUSING FOR A TURBINE ENGINE

CROSS-REFERENCE TO RELATED APPLICATIONS

The present invention is the US national stage under 35 U.S.C. § 371 of International Application No. PCT/EP2020/060336 which was filed on Apr. 10, 2020, and which claims the priority of application BE 2019/5325 filed on May 16, 2019, the content of which (text, drawings and claims) are incorporated here by reference in its entirety.

FIELD

The invention relates to the design of a turbomachine, in particular an aircraft turbojet engine or an aircraft turboprop engine. The invention relates in particular to the casing of a compressor.

BACKGROUND

In an axial turbomachine, and in particular in its compressor(s), the airflow is compressed by alternating rotor blades and stator vanes. The stator vanes extend radially inwards from an outer shroud which delimits the airflow path. EP 1 426 559 A1 describes an example of the compressor architecture of such an axial turbomachine. The shroud that holds the stator vanes has upstream and downstream flanges to attach the shroud to the fan casing positioned upstream of the shroud and to the inter-compressor casing positioned downstream of the shroud. The shroud is therefore on the one hand a vector transmitting axial forces and torque between the various casings to which it is attached and on the other hand it supports the forces experienced by the stator vanes inside the compressor. These two sources of forces generate stress concentration zones, particularly at the zone where the vanes are anchored to the shroud. The usual way to ensure mechanical strength in these stress zones is to provide extra thicknesses for the shroud or to provide reinforcing parts and therefore additional weight.

SUMMARY

The aim of the invention is to overcome the disadvantages described above and in particular to offer a lighter compressor and turbomachine without reducing their mechanical strength.

The object of the invention is a compressor casing for a turbomachine and in particular for an aircraft turbojet engine, the casing being remarkable in that it comprises: a shell comprising a radially inner surface; an upstream ferrule; and a downstream ferrule, each of the ferrules having a respective internal surface capable of delimiting an air flow, and each of the ferrules having a respective external surface facing the internal surface of the shell, the ferrules being fixed to the shell in a cantilevered manner and being arranged axially in such a way as to have an axial clearance between them, the ferrules each comprising a respective distal axial end, these defining said axial clearance therebetween, and the ferrules being attached to the shell only at their respective proximal end axially opposite their distal end.

In other words, the technical solution aims to dissociate the external forces that the casing must transmit due to its intermediate position in the turbomachine from the forces induced by the vanes inside the casing.

By "facing", it is meant a radial proximity between the outer surface of the ferrules and the inner surface of the shell. The outer surface of the ferrules can contact the shell at the fasteners between the ferrules and the shell and can be spaced apart with a small amount of mounting clearance. This overhang avoids friction between the outer surface of the ferrules and the inner surface of the shell and thus avoids the transmission of forces from the ferrules to the shell. As described below, the cantilever can be about 80% of the axial length of the ferrules.

The axial clearance between the ferrules is not simply a clearance to allow the vanes to be mounted close to each other to absorb a certain manufacturing tolerance. The clearance is an intentional clearance that is intended to prevent any axial contact between the two ferrules in order to avoid any transfer of force from one to the other. In other words, each ferrule is only in contact with the shell and the vanes of the ferrule; and the force balance of each ferrule is therefore limited to the force induced by the air flow on the ferrule or on the stator vanes that it supports, the reaction force of the attachment to the shell and gravity.

According to various exemplary advantageous embodiments of the invention, the casing can comprise one or more of the following features, taken in isolation or in any technically possible combination:

the axial clearance between the ferrules is of such a size that when the shell is compressed under the action of maximum permissible thermomechanical conditions for the compressor, the ferrules remain axially spaced from each other. Since axial clearance is desired even during operation of the turbo machine, it should be designed in such a way that the clearance exists even under the extreme operating conditions. Thus, the clearance is designed as a consequence of the extreme deformations of the shell, calculated for the maximum thermomechanical conditions admissible by the compressor. These boundary conditions are known to the person skilled in the art;

the ferrules are attached, each independently of the other, to the shell. Thus, the ferrules are attached to the shell in different areas of the shell;

the upstream ferrule and the shell comprise respective upstream radial flanges, the upstream ferrule being secured to the shell by means of screw elements, in various instances axially oriented, securing the upstream radial flange of the upstream ferrule to the upstream radial flange of the shell. The screw elements can be screws angularly distributed around the axis of symmetry of the casing;

the shell comprises a downstream radial flange provided with fixing holes and the downstream ferrule is fixed to the shell by means of fixing elements, in various instances radially oriented, which penetrate the fixing holes of the downstream radial flange of the shell. The fasteners can be, for example, screws whose heads are embedded in the ferrule, so as not to alter the continuity of the airflow guiding surface provided by the inner surface of the ferrule;

the axial clearance between the ferrules is filled by a seal, in particular a seal made of silicone. Silicone is sufficiently flexible not to transmit any force between the two ferrules and to ensure the continuity of the air guiding surface whatever the state of expansion or compression of the shell;

the shell axially overlaps each ferrule by a respective overlap length and the respective outer surface of the ferrules coincides with the inner surface of the shell over at most 20% of the respective overlap length. Thus, the ferrules can possibly be radially distanced from the surface of the shell, if the design so requires in terms of air guidance on the one hand and the surrounding parts of the shell on the other hand, whereby the shell and the ferrules are in various instances of constant thickness;

the casing comprises an additional ferrule inserted between the upstream and downstream ferrules, and an axial clearance separates the ferrules in pairs;

each ferrule supports at least one, in various instances exactly one, row of stator vanes extending radially inwards from the respective ferrule;

each ferrule receives a layer of abradable material disposed upstream of a row or of each row of stator vanes and arranged on the inner surface of the ferrule. The abradable material is adapted to cooperate with the radially outer ends of an impeller of a rotor;

the shell comprises an outer surface with reinforcements in the form of thickenings defining a cylindrical or conical surface. These reinforcements serve to stiffen the shell. It may be of interest for reasons of thermal homogeneity and/or for reasons of vibration to provide these reinforcements axially at a distance from the stator vanes and/or axially at a distance from the layer(s) of abradable material.

The invention also relates to a turbomachine comprising a low-pressure compressor, a high-pressure compressor and an intermediate casing, arranged between the low-pressure compressor and the high-pressure compressor, the turbomachine being remarkable in that the low-pressure compressor has a casing according to one of the abovementioned embodiments and a row of variable stator vanes upstream of the casing, the shell of the casing extending axially from the row of variable stator vanes to the intermediate casing.

According to an exemplary advantageous embodiment, the row of variable stator vanes comprises a flange of substantially T-shaped cross-section with a radial branch and an axial branch, the radial branch contacting the radial flange of the upstream ferrule, and the axial branch axially overlapping the radial flange of the upstream ferrule and axially overlapping the upstream radial flange of the shell.

According to an exemplary advantageous embodiment, the row of variable stator vane comprises a centering surface of the upstream ferrule; and/or the axial branch comprises a centering surface of the upstream radial flange of the upstream ferrule and/or the shell.

According to an exemplary advantageous embodiment, the axial branch comprises a cylindrical surface that supports a variable vane actuation mechanism, the cylindrical surface axially overlapping the upstream radial flange of the ferrule and the upstream radial flange of the shell. The mechanism can be made of a synchronising ring supported by shoes, the ring synchronising the pivoting motion of connecting rods integral with the variable stator vanes. This design allows the forces of the actuating mechanism to be supported by several parts, which can therefore be of lesser thickness at this point.

In general, the exemplary advantageous embodiments of each object of the invention are also applicable to the other objects of the invention. Each object of the invention is combinable with the other objects, and the objects of the invention are also combinable with the embodiments of the description, according to any technically feasible combination, unless explicitly mentioned otherwise.

Advantages

In a known turbojet engine, a single shroud concentrates, on the one hand, the axial forces and the torque between the various casings to which it is attached, i.e., part of the thrust coming from the fan, via the epicyclic gear train for example, and on the other hand, the "internal" forces caused by the aerodynamic flow and going up via the stator vanes inside the shroud. There are therefore areas of the shroud that concentrate stresses linked to these two forces at the junction of the vanes' heads and the shroud.

These two sources of stress are dissociated in the invention by the use of the shell and the ferrules. The forces experienced by the vanes are not transmitted directly to the shell but are displaced to the ends of the ferrules attached to the shell.

Among the advantages associated with this design, the casing can be designed with smaller and therefore lighter parts because it is subject to less local mechanical stress.

Another advantage of having different parts (shell and ferrules) is that it is possible to replace only one of these parts in the event of a manufacturing or usage failure rather than replacing the entire casing.

DRAWINGS

FIGS. 3 to 6 exemplarily illustrate respectively a first, a second, a third and a fourth embodiment of the casing according to various embodiments of the invention.

DETAILED DESCRIPTION

In the following description, the terms "internal" (or "inside") and "external" (or "outside") refer to a positioning with respect to the axis of rotation of a turbomachine. The axial direction is the direction along the axis of rotation of the turbomachine. The radial direction is perpendicular to the axis of rotation. Upstream and downstream refer to the main flow direction of the airflow in the turbomachine. The term "integral" is understood to mean rotationally integral, and in particular rigidly connected. The term "monobloc" is equivalent to "made from the same material" and refers to different elements made from the same block of material, as opposed to "attached", the latter meaning that one element is attached to another element after its manufacture. The figures show the elements schematically, in particular without all the assembly or sealing elements. The dimensions, and in particular the radial thickness of the elements drawn, are exaggerated in order to facilitate understanding of the figures.

Figure 1:
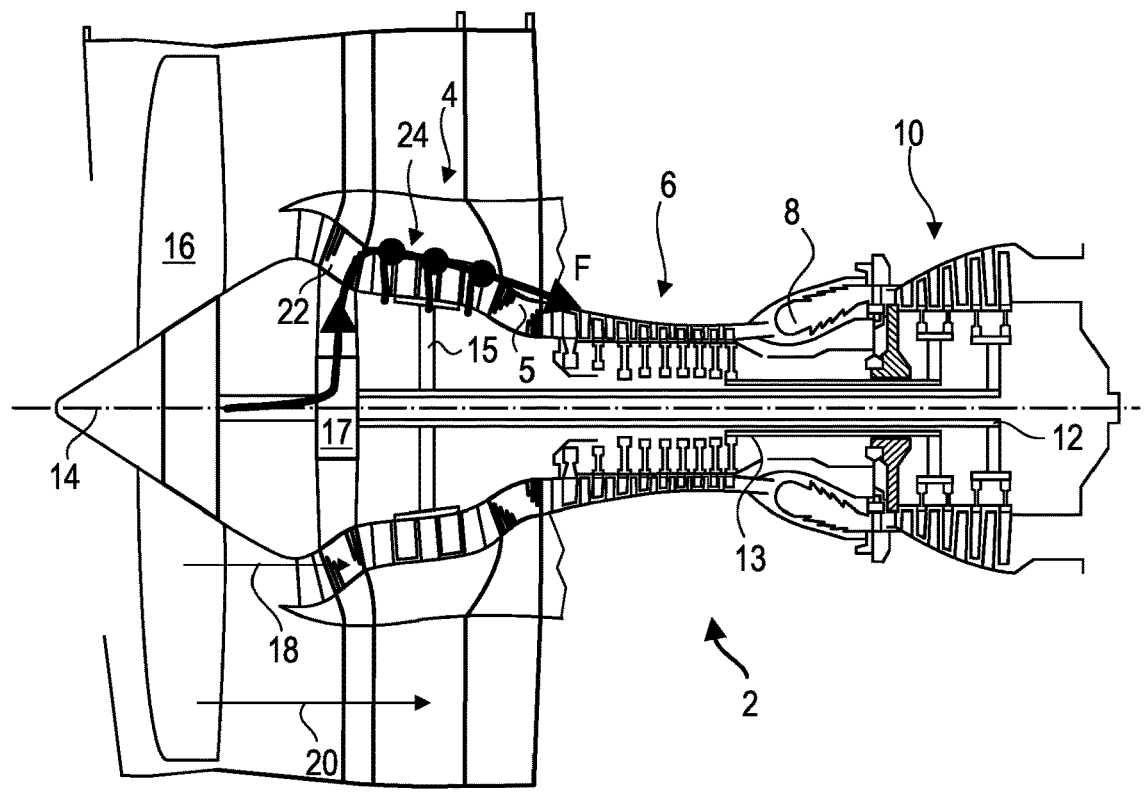
FIG. 1 shows an exemplary turbomachine according to various embodiments of the invention.

FIG. 1 is a simplified representation of a turbojet engine 2. The turbojet engine 2 comprises a first, low-pressure compressor 4 and a second, high-pressure compressor 6, a combustion chamber 8 and two turbines 10. In operation, the mechanical power of the turbines 10 sets the two compressors 4 and 6 in motion by means of respective shafts 12, 13. The compressors 4, 6 have a number of rows of rotor (or rotor blades) associated with rows of stator (or stator vanes). Rotation of the rotor 15 about its axis of rotation 14 thus generates a flow of air which is progressively compressed, up to the inlet of the combustion chamber 8.

A fan 16 is coupled to the shaft 12 and generates an air flow which is split into a primary flow 18 and a secondary flow 20, the secondary flow 20 passing through an annular duct (partially shown) along the machine and then joining the primary flow at the outlet of the turbines.

Reduction means, such as an epicyclic gearbox 17, can reduce the speed of rotation of the fan 16 relative to the associated turbine.

An upstream casing 22 with support arms (or "struts") holds the epicyclic gearbox 17 and supports the upstream part of the turbomachine. A compressor casing 24 supports the compressor 4. An inter-compressor casing 5 with support arms is arranged between the low-pressure compressor 4 and the high-pressure compressor 6.

In operation, the various casings are subject to high loads. The fan tends to pull the whole aircraft forward. The casings are mechanical parts and must therefore each support at least part of the thrust generated by the fan. Also, the casings must absorb the forces transmitted by the blades and in particular the stator vanes which straighten the air flow in the compressor. These forces are shown schematically by the arrow marked F in FIG. 1 and the points can be seen where stress concentrates due to the force paths meeting there.

Figure 2:
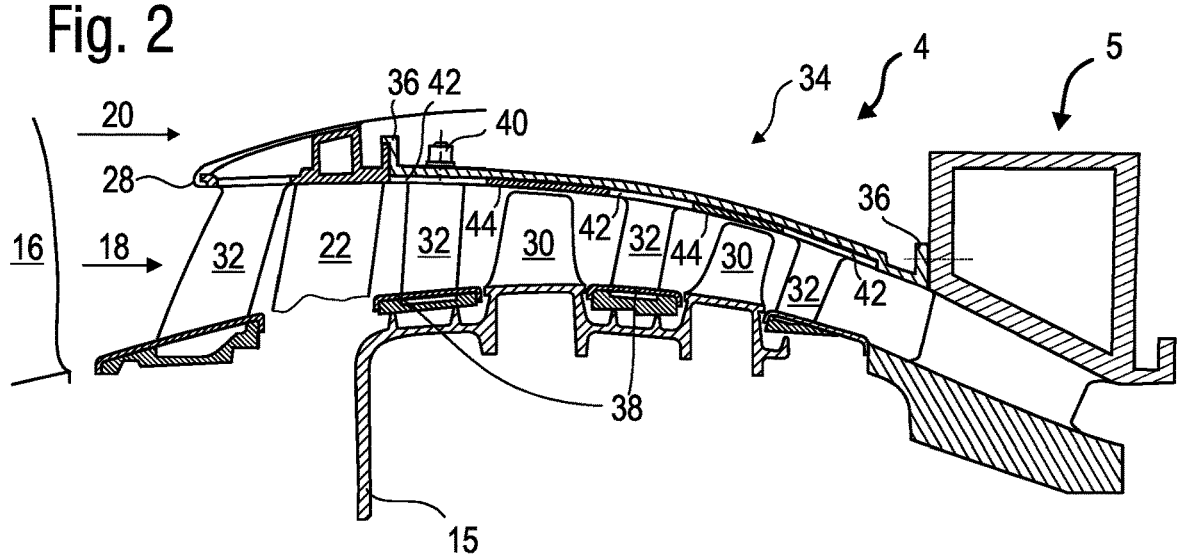
FIG. 2 shows an exemplary schematic cross-sectional view of a portion of a compressor of the state of the art.

FIG. 2 is a cross-sectional view of the compressor 4 in a known turbomachine. A portion of the fan 16 and the separation nozzle 28 for splitting the primary 18 and secondary 20 flows can be seen. The rotor 15 can comprise several rows of rotor blades 30.

The low-pressure compressor 4 comprises at least one rectifier which contains an annular row of stator vanes 32, the purpose of which is to rectify the direction of the airflow deflected by the rotating blades.

The low-pressure compressor 4 comprises a casing 34. The casing 34 has a generally axisymmetric shape which can incorporate stiffening reinforcements, grooves or ribs. The casing 34 comprises fixing flanges 36, for example annular fixing flanges 36 for fixing the separator nozzle 28 and/or for fixing to an intermediate casing 5 of the turbomachine.

The stator vanes 32 extend substantially radially from the casing 34 to internal shrouds 38. One of the rows of stator vanes 32 can be variably oriented about its axis 40. The stator vanes 32 are attached to the casing 34 by means of platforms 42. A layer of abradable material 44 is generally provided facing the rotor blades 30. In such a configuration, the stator vane anchoring zones (around the platforms 42) are stress concentration zones because they concentrate both the forces absorbed by the stator vanes induced by the straightening of the air flow 18 and the forces transmitted from the fan 16 or the gearbox 17.

FIG. 3 shows a first embodiment of a casing 50 according to the invention. The casing 50 comprises a shell 52 of substantially axisymmetric shape around the axis 14 of the compressor. The shell 52 defines an internal cavity which houses an upstream ferrule 54 and a downstream ferrule 56. The shell 52 and the ferrules 54, 56 can extend 360° around the axis 14 or be formed of a plurality of angular sectors which together form 360°.

The shell 52 comprises a radially inner surface 52.1 and a radially outer surface 52.2. The ferrules 54, 56 comprise radially outer surfaces 54.1, 56.1 facing the inner surface 52.1 of the shell 52. The outer surfaces 54.1, 56.1 can have a profile approximating that of the inner surface 52.1. Thus, the ferrules 54, 56 are arranged with a slight radial clearance within the shell 52 allowing them to be assembled and avoiding transmission of force between the outer surfaces of the ferrules and the inner surface of the shell.

As shown in an enlarged portion of FIG. 3, an axial clearance 58 is provided between the ferrules 54, 56. This clearance 58 can optionally be filled with a resilient material that provides continuity to the air guiding surface such as a silicone seal (not shown).

The axial clearance 58 is measured between the distal end 54.2 of the upstream ferrule 54 and the distal end 56.2 of the downstream ferrule 56.

The upstream ferrule 54 supports an annular row of stator vanes 60. The downstream ferrule 56 supports an annular row of stator vanes 62. The stator vanes 60, 62 extend radially from their respective ferrules 54, 56 towards the axis 14. At their inner end, these vanes are joined by an inner shroud 64, 66, the inner surface of which is coated with an abradable material 68, 70 for contacting the rotor (not shown).

The vanes 60, 62 can be attached to their respective ferrules 54, 56 by means of platforms (similar to number 42 in FIG. 2).

The upstream ferrule 54 comprises an upstream radial flange 54.3. It is located in the vicinity of its proximal end 54.4, i.e., the end axially opposite that which defines the clearance 58. The upstream radial flange 54.3 can be located within the first fifth of the axial length of the upstream ferrule 54.

The upstream ferrule 54 is attached, via its upstream radial flange 54.3, to an upstream radial flange 52.3 of the shell. A plurality of screw elements (not shown) angularly distributed around axis 14 and mainly axially oriented, secure the two flanges 52.3, 54.3 together. This is the only place where the ferrule 54 is attached to the shell 52.

The downstream ferrule 56 comprises radial holes 56.3 arranged in the vicinity of its proximal end 56.4, i.e., the end axially opposite that which defines the clearance 58. These holes 56.3 are axially and circumferentially aligned with threaded holes 52.4 provided in a downstream radial flange 52.5 of the shell 52. Thus, screwed elements (not shown) can be used to secure the downstream ferrule 56 to the shell. These elements are in various instances screws whose heads are embedded in the material so as not to protrude into the air stream. An amalgam of material—for example of the abradable type—can fill in any gap between the head and the internal surface 56.5 of the ferrule to complete the continuity of the air guiding surface.

Thus, the ferrules 54, 56 are fixed to the shell 52 independently of each other, and the clearance 58 is measured between the two cantilevered ends 54.2, 56.2. There is no transmission of force from one ferrule 54 to the other 56.

Therefore, when the shell 52 deforms in operation (expansion, compression, torsion, etc.), it does not generate stresses on the ferrules 54, 56.

A layer of abradable material 72, 74 can be applied to the inner surface 54.5, 56.5 of the ferrules 54, 56, which layer 72, 74 is capable of interacting with the radially outer ends of rotor blades (marked 30 in FIG. 2).

The shell 52 can accommodate reinforcement zones to stiffen it in torsion and/or tension. For example, thicker material is provided in the form of cylindrical or conical surfaces 52.21, 52.22.

Directly upstream of the casing 50 is a row 76 of variable stator vanes 78.

The vanes 78 extend substantially radially from an outer ring 80 to an inner ring 82. The vanes 78 are attached to the outer ring 80 by means of pins or trunnions 84. The trunnions 84 are pivotally driven by a respective connecting rod 86 about its axis 88. The connecting rod 86 is integral with the trunnion 84, secured for example by a nut 90.

The connecting rods 86 of the annular row of vanes 78 are all connected to a synchronising ring 92 by means of rods. These rods can terminate internally in pads 94. The mechanism can be equivalent to that described in patent application 13E2018/5429 of the same Applicant.

The ring 80 comprises a T-shaped flange 80.1 with a radial branch 80.2 contacting the upstream radial flange 54.3 of the upstream ferrule 54 and an axial branch 80.3 overhanging the upstream radial flanges 52.3, 54.3.

The axial branch 80.3 has a cylindrical outer surface 80.4 on which the synchronising ring 92 or pads 94 attached thereto rest.

The ring 80 comprises an internal surface 80.5 for centering the external surface 54.1 of the upstream ferrule 54. Alternatively or additionally, the axial branch 80.3 can have an internal surface for centering the upstream radial flanges 52.3, 54.3 and thus for centering the shell 52 and the upstream ferrule 54.

FIG. 4 describes a second embodiment of the casing 150 of the invention. The reference numbers are incremented by 100. Only the distinctive features of this embodiment will be described here.

In this example, the downstream ferrule 156 supports two rows of stator vanes 162. Each of these rows partially rectifies the airflow so that downstream of the second row, the flow is predominantly axially oriented.

FIG. 5 describes a third embodiment of the casing 250 of the invention. The reference numbers are incremented by 100. Only the distinctive features of this embodiment will be described here. In this example, an additional ferrule 255 is positioned between the upstream ferrule 254 and the downstream ferrule 256. A respective clearance, 258.1, 258.2 separates the ferrules 254, 255, 256 in pairs. The clearances 258.1, 258.2 can be of different axial lengths.

The additional ferrule 255 can be screwed or riveted to the shell 252. The additional ferrule 255 is in various instances composed of several angular sectors.

The additional ferrule 255 has the same properties as the upstream and downstream ferrules (254, 256), namely that it supports one or more stator vanes, and its external profile coincides with that of the shell.

Alternatively or additionally, the additional ferrule 255 can comprise radial flanges (not shown) for attachment to the shell 252, the radial flanges penetrating internal grooves (not shown) of the shell 252.

FIG. 6 shows the shell 352 and ferrules 354, 356 in a fourth embodiment. This figure highlights the clearance that extends between the outer surface 354.1, 356.1 of the ferrules 354, 356 and the inner surface 352.1 of the shell 352. This clearance can in various instances be less than 1 mm and extends over an axial length 1354 and 1356 which is at most 80% of the length of the overlap between the ferrules 354, 356 and the shell 352, which overlap lengths are noted as L354 and L356. The clearance can be variable and show offsets 394, 396 which can be useful to best fit the air guiding surface 354.5, 356.5 while meeting geometric constraints of the shell 352 and maintaining a substantially constant thickness for the ferrules 354, 356 and the shell 352.

The invention has been described by means of four embodiments but is not limited thereto. Elements of each embodiment are combinable with elements of other embodiments. For example, the abradable material layers 72, 74 or the bearing surfaces 52.21, 52.22, can be integrated in the embodiments of FIGS. 4 to 6. It is also clear to the person skilled in the art that the number of vanes per ferrule can be adapted as desired.

The invention claimed is:

1. A casing for a compressor of a turbomachine, said casing comprising:
   a shell extending 360° around an axis or formed of a plurality of angular sectors which together form 360° around the axis, the shell being made, in a cross-section along the axis, of a single and continuous material and comprising a radially inner surface;
   an upstream ferrule having an inner surface guiding an airflow, an outer surface facing the inner surface of the shell, a proximal end and a distal end, the proximal end of the upstream ferrule being arranged upstream of the distal end of the upstream ferrule; and
   a downstream ferrule having an inner surface guiding the airflow, an outer surface facing the inner surface of the shell, a proximal end and a distal end, the proximal end of the downstream ferrule being arranged downstream of the distal end of the downstream ferrule;
   wherein the upstream and downstream ferrules are fixed to the shell in a cantilevered manner, the upstream and downstream ferrules being fixed respectively to the shell only at their respective proximal ends;
   and wherein the upstream ferrule and the downstream ferrule are positioned axially such that an axial clearance is formed between their respective distal ends.

2. The casing according to claim 1, wherein the axial clearance between the ferrules is of such a size that when the shell is compressed under the action of maximum permissible thermomechanical conditions for the compressor, the ferrules remain axially spaced apart from each other.

3. The casing according to claim 1, wherein the shell comprises a downstream radial flange provided with threaded holes for fastening the downstream ferrule to the shell.

4. The casing according to claim 1, wherein the upstream ferrule and the downstream ferrule each supports exactly one row of stator vanes.

5. The casing according to claim 4, wherein each of the upstream and downstream ferrules receives on its inner surface a layer of abradable material arranged axially upstream of the row of stator vanes.

6. The casing according to claim 4, wherein the shell comprises an outer surface having reinforcements in the form of thickenings defining a cylindrical or conical surface.

7. The casing according to claim 1, further comprising a row of variable stator vanes arranged upstream of the shell.

8. The casing according to claim 1, wherein the upstream ferrule and the shell comprise respective upstream radial flanges, the casing further comprising a T-shaped flange with a radial branch and an axial branch, the radial branch contacting the upstream radial flange of the upstream ferrule, and the axial branch axially overlapping the upstream radial flange of the upstream ferrule and axially overlapping the upstream radial flange of the shell.

9. The casing according to claim 1, wherein the shell axially overlaps each ferrule by a respective overlap length and the respective outer surface of the ferrules coincides with the inner surface of the shell over no more than 20% of the respective overlap length.

10. The casing according to claim 1, wherein the casing comprises an additional ferrule interposed between the upstream and downstream ferrules, and an axial clearance separates the additional ferrule from the upstream ferrule and an axial clearance separates the additional ferrule from the downstream ferrule.

\* \* \* \* \*